(12) United States Patent
Zhang et al.

(10) Patent No.: US 10,160,878 B2
(45) Date of Patent: Dec. 25, 2018

(54) AQUEOUS COATING COMPOSITION

(71) Applicants: Rohm and Haas Company, Philadelphia, PA (US); Dow Global Technologies LLC, Midland, MI (US)

(72) Inventors: Qingwei Zhang, Shanghai (CN); Hongping Xu, Zheijiang (CN); Han Liu, Shanghai (CN); Xiangting Dong, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 127 days.

(21) Appl. No.: 15/032,162

(22) PCT Filed: Oct. 29, 2013

(86) PCT No.: PCT/CN2013/086127
§ 371 (c)(1),
(2) Date: Apr. 26, 2016

(87) PCT Pub. No.: WO2015/061959
PCT Pub. Date: May 7, 2015

(65) Prior Publication Data
US 2016/0257837 A1    Sep. 8, 2016

(51) Int. Cl.
| | |
|---|---|
| *C08K 5/05* | (2006.01) |
| *C09D 125/14* | (2006.01) |
| *C08K 5/06* | (2006.01) |
| *C08K 5/10* | (2006.01) |
| *C08K 5/12* | (2006.01) |
| *C08K 5/103* | (2006.01) |
| *C08K 5/11* | (2006.01) |
| *C08K 5/09* | (2006.01) |
| *C08K 5/092* | (2006.01) |
| *C09D 143/02* | (2006.01) |
| *C09D 7/61* | (2018.01) |
| *C08K 3/22* | (2006.01) |

(52) U.S. Cl.
CPC ............ *C09D 125/14* (2013.01); *C08K 5/05* (2013.01); *C08K 5/06* (2013.01); *C08K 5/09* (2013.01); *C08K 5/092* (2013.01); *C08K 5/10* (2013.01); *C08K 5/103* (2013.01); *C08K 5/11* (2013.01); *C08K 5/12* (2013.01); *C09D 7/61* (2018.01); *C09D 143/02* (2013.01); *C08K 3/22* (2013.01); *C08K 2003/2241* (2013.01); *C08L 2201/54* (2013.01)

(58) Field of Classification Search
CPC .......... C09D 125/14; C08K 5/05; C08K 5/06; C08K 5/09; C08K 5/092; C08K 5/10; C08K 5/103; C08K 5/11; C08K 5/12
See application file for complete search history.

(56) References Cited

U.S. PATENT DOCUMENTS

| | | |
|---|---|---|
| 6,756,459 B2 | 6/2004 | Larson et al. |
| 8,158,713 B2 | 4/2012 | Finegan et al. |
| 8,158,714 B2 | 4/2012 | Nair et al. |
| 2010/0124614 A1 | 5/2010 | Wildeson et al. |

FOREIGN PATENT DOCUMENTS

| | | |
|---|---|---|
| EP | 1923504 A1 | 5/2008 |
| WO | 1999014278 A1 | 3/1999 |
| WO | 2013116318 A1 | 8/2013 |

*Primary Examiner* — Peter D. Mulcahy
(74) *Attorney, Agent, or Firm* — Karl E. Stauss; Cantor Colburn LLP

(57) ABSTRACT

An aqueous coating composition having acceptable heat-age stability and providing the resultant coating film with good washability.

10 Claims, No Drawings

US 10,160,878 B2

AQUEOUS COATING COMPOSITION

FIELD OF THE INVENTION

The present invention relates to an aqueous coating composition.

INTRODUCTION

Pigment-containing aqueous coating compositions typically comprise an aqueous acrylic polymer dispersion, a coalescent, and pigments and/or extenders. The coalescent is generally used to facilitate film formation by reducing the minimum film formation temperature (MFFT) of the acrylic polymer. The dosage of the coalescent depends on the glass transition temperature ($T_g$) of the acrylic polymer and is usually in an amount of at least [$T_g$ (in ° C.)/2]% by weight based on the solids weight of the acrylic polymer dispersion. The aqueous acrylic polymer dispersion as a binder may comprise polymer particles having phosphate groups intimately bound to the particles' surface formed by the emulsion polymerization of the polymer with ethylenically unsaturated phosphorus-containing monomers. The phosphate groups can generate strong interaction between inorganic pigments and/or extenders and the polymer particles. Using such polymers functionalized with phosphate groups in coating compositions with a pigment volume concentration (PVC) of at least 70% can dramatically improve the washability of the resultant films. However, such strong interaction also tends to cause viscosity increase of coating compositions during storage, especially when the copolymerized ethylenically unsaturated phosphorus-containing monomers are present in an amount of from 1.0 to 3.5% by weight based on the weight of the acrylic polymer. The coating industry generally requires coating compositions having a viscosity change no more than 15 Krebs units (KU) after storage at 50° C. for 10 days.

Therefore, it is desirable to provide a high PVC coating composition that provides the resultant coating film with better washability than coating compositions comprising acrylic copolymers containing no phosphorous-containing copolymerized units, while still having desired storage stability as described above.

SUMMARY OF THE INVENTION

The present invention provides a novel aqueous coating composition with desired heat-age stability that also provides coating films with good washability. The aqueous coating composition of the present invention combines an emulsion copolymer comprising from 1.5 to 3.5% by weight copolymerized phosphorous-containing monomers based on the solids weight of the emulsion copolymer, a specific low amount of coalescent, and pigments and/or extenders. Surprisingly, the aqueous coating composition of the present invention has acceptable heat-age stability, as evidenced by the medium shear viscosity change of the aqueous coating composition no more than 15 KU after storage at 50° C. for 10 days. In some embodiments, the washability of the aqueous coating composition upon drying is 50% greater than that of a coating composition comprising an emulsion copolymer that contains no phosphorous-containing copolymerized units, upon drying.

The present invention is an aqueous coating composition comprising:

(a) an aqueous copolymer dispersion comprising an emulsion copolymer having a glass transition temperature of from 8 to 40° C. and comprising, as copolymerized units, based on the solids weight of the emulsion copolymer, from 1 to 3.5% by weight of a phosphorus-containing monomer selected from a phosphoalkyl (meth)acrylate, a phosphoalkoxy (meth)acrylate, salts thereof, and mixtures thereof;

wherein the aqueous copolymer dispersion is present in an amount of from 2.5 to 7.5% by solids weight based on the total weight of the aqueous coating composition;

(b) a coalescent having a concentration, $C_c$, based on the solids weight of the aqueous copolymer dispersion, being determined as follows:

$$C_c < (\tfrac{2}{5} * T_g - C_P * 100 + 4)/100$$

wherein $T_g$ is the glass transition temperature of the emulsion copolymer, ° C.; and $C_p$ is the concentration of the copolymerized phosphorous-containing monomer based on the solids weight of the emulsion copolymer; and (c) pigments and/or extenders.

DETAILED DESCRIPTION OF THE INVENTION

The aqueous copolymer dispersion useful in the present invention comprises one or more emulsion copolymers.

The emulsion copolymer in the aqueous copolymer dispersion may comprise, as copolymerized units, at least one ethylenically unsaturated nonionic monomer. "Nonionic monomers" herein refer to monomers that do not bear an ionic charge between pH=1-14. Examples of suitable ethylenically unsaturated nonionic monomers useful in the present invention include (meth)acrylic ester monomers such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, and mixtures thereof; (meth)acrylonitrile; (meth)acrylamide; amino-functional and ureido-functional monomers; monomers bearing acetoacetate-functional groups; ethylenically unsaturated monomers having a benzene ring such as styrene and substituted styrenes; butadiene; α-olefins such as ethylene, propylene, and 1-decene; vinyl acetate, vinyl butyrate, vinyl versatate and other vinyl esters; vinyl monomers such as vinyl chloride and vinylidene chloride; and mixtures thereof. In a preferred embodiment, the emulsion copolymer comprises, as copolymerized units, from 85 to 99%, from 90 to 99.5%, or from 92 to 99%, by weight based on the solids weight of the emulsion copolymer of at least one ethylenically unsaturated nonionic monomer selected from styrene, $C_2$-$C_{12}$ alkyl esters of (methyl) acrylic acids, derivatives thereof, and mixtures thereof.

The term "acrylic" herein refers to (meth)acrylic acid, (meth)alkyl acrylate, (meth)acrylamide, (meth)acrylonitrile and modified forms thereof, for example, (meth)hydroxyalkyl acrylate. The term "(meth)acrylic" refers to any of acrylic, methacrylic, and mixtures thereof.

The emulsion copolymer in the aqueous copolymer dispersion may comprise, as copolymerized units, at least one ethylenically unsaturated phosphorous-containing monomer. Examples of suitable ethylenically unsaturated phosphorus-containing monomers include, phosphoalkyl (meth)acrylates such as phosphoethyl (meth)acrylate, phosphopropyl (meth)acrylate, and phosphobutyl (meth)acrylate, salts thereof, and mixtures thereof; phosphoalkoxy (meth)acrylates such as phospho ethylene glycol (meth)acrylate, phospho diethylene glycol (meth)acrylate, phospho tri-ethylene glycol (meth)acrylate, phospho propylene glycol (meth)acrylate, phospho di-propylene glycol (meth) acrylate, phospho tripropylene glycol (meth)acrylate, salts thereof, and mixtures thereof. Preferred ethylenically unsaturated phosphorous-containing monomers are selected from phosphoalkyl (meth)acrylates or phosphoalkoxy(meth) acrylates, and salts thereof, especially, phosphoethyl methacrylate (PEM).

The emulsion copolymer in the aqueous copolymer dispersion may comprise, by weight based on the solids weight of the emulsion copolymer, 1% or more of the copolymerized ethylenically unsaturated phosphorus-containing monomers, 1.5% or more, or even 2% or more, and at the same time, 3.5% or less, 3.0% or less, or even 2.5% or less.

The emulsion copolymer in the aqueous copolymer dispersion may further comprise, as copolymerized units, at least one ethylenically unsaturated monomer carrying at least one functional group selected from carboxyl, carboxylic anhydride, hydroxyl, amide, and mixtures thereof. Examples of these types of monomers include ethylenically unsaturated carboxylic or dicarboxylic acids, and preferably acrylic or methacrylic acid, itaconic acid, and maleic acid; amides, and preferably N-alkylolamides or hydroxyalkyl esters of the above-mentioned carboxylic acids, such as acrylamide, methacrylamide, N-methylolacrylamide, N-methylolmethacrylamide, 2-hydroxyethylacrylamide, 2-hydroxyethylmethacrylamide, hydroxyethyl acrylate, hydroxy ethyl methacrylate, hydroxypropyl acrylate and hydroxypropyl methacrylate. The emulsion copolymer may comprise, by weight based on the solids weight of the emulsion copolymer, up to 5%, or from 0.5 to 3% of the copolymerized ethylenically unsaturated carboxylic acid monomers.

The emulsion copolymer in the aqueous copolymer dispersion may comprise, as copolymerized units, at least one ethylenically unsaturated monomer carrying at least one alkoxysilane functionality, preferably hydrolyzable alkoxysilane functionality. Examples of suitable ethylenically unsaturated monomers carrying at least one alkoxysilane functionality include vinyltrialkoxysilanes such as vinyltrimethoxysilane, alkylvinyldialkoxysilanes, (meth)acryloxyalkyltrialkoxysilanes such as (meth)acryloxyethyltrimethoxysilane and (meth) acryloxypropyltrimethoxysilane, or their derivatives. It is also contemplated that the silane functionality may be added after the polymerization of at least one ethylenically unsaturated nonionic monomer and an alkoxysilane-capable precursor monomer. An alkoxysilane-capable precursor monomer is a monomer that has a reactive group that is capable, after polymerization, of reacting with an alkoxysilane containing compound to yield an alkoxysilane-containing functional group attached to the copolymer.

The emulsion copolymer may comprise, by weight based on the solids weight of the emulsion copolymer, 0.01% or more of the copolymerized ethylenically unsaturated monomer carrying at least one alkoxysilane functionality, 0.05% or more, or even 0.1% or more, and at the same time, 3% or less, 1.5% or less, or even 1% or less.

In a preferred embodiment, the emulsion copolymer useful in the present invention comprises, based on the solids weight of the emulsion copolymer, from 1 to 3.5% by weight of copolymerized phosphorous-containing monomers, from 35 to 65% by weight of copolymerized styrene or its derivatives, from 30 to 60% by weight of copolymerized ester of (methyl) acrylic acid or its derivatives, from 0.5 to 3% by weight of copolymerized ethylenically unsaturated carboxylic acid monomers, and from 0.05 to 1% by weight of copolymerized ethylenically unsaturated monomer carrying at least one alkoxysilane functionality.

The emulsion copolymer in the aqueous copolymer dispersion may have a glass transition temperature ($T_g$) of 8° C. or more, 15° C. or more, or even 20° C. or more, and at the same time, 40° C. or less, 35° C. or less, or even 30° C. or less. The $T_g$ value herein is calculated by the linear equation, for example, $$T_g = W_a * T_{ga} + W_b * T_{gb} + W_c * T_{gc}$$

wherein $T_{ga}$, $T_{gb}$, and $T_{gc}$ refer to the $T_g$ of Monomer a, Monomer b, and Monomer c, respectively; and $W_a$, $W_b$, and $W_c$ refer to the weight fraction of Monomer a, Monomer b, and Monomer c, based on the weight of total monomers, respectively.

The aqueous copolymer dispersion useful in the present invention may contain solids present from 30 to 70% by weight, from 35 to 60% by weight, or from 40 to 50% by weight, based on the total weight of aqueous copolymer dispersion.

The polymerization techniques used to prepare the emulsion copolymers are well known in the art, for example, an emulsion polymerization. In the emulsion polymerization process, conventional surfactants may be used. These conventional surfactants may include anionic and/or nonionic emulsifiers, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of the surfactant used is usually 0.1 to 6% by weight, based on the total weight of monomers.

Either thermal or redox initiation processes may be used in the emulsion polymerization process. The reaction temperature may be maintained at a temperature lower than 100° C. throughout the course of the reaction. Preferred reaction temperature is between 30 and 95° C., or between 50 and 90° C. A mixture of monomers may be added neat or as an emulsion in water. The monomer mixture may be added in one or more additions or continuously, linearly or not, over the reaction period, or combinations thereof.

In the emulsion polymerization process, conventional free radical initiators may be used. Examples of suitable free radical initiators include hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid. The free radical initiators may be used typically at a level of 0.01 to 3.0% by weight, based on the weight of total monomers. Redox systems comprising the above described initiators coupled with a suitable reductant may be used in the emulsion polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids. Redox reaction catalyzing metal salts of iron, copper, manganese, silver, platinum, vanadium, nickel, chromium, palladium, or cobalt may be used. Chelating agents for the metals may optionally be used.

The average particle diameter of the emulsion copolymer particles may be from 50 to 350 nanometers (nm), preferably from 50 to 300 nm, as measured by a BI-90 Particle Sizer. Without being bound by a particular theory, it is believed that particle sizes lower than 50 nm lead to greater emulsion copolymer shear instability and that particle sizes larger than 300 nm lead to lower binding capacity and therefore poorer washability.

The aqueous coating composition of the present invention may also comprise one or more coalescents. "Coalescents" herein refer to slow-evaporating or non-evaporating solvents that fuse polymer particles into a continuous film under ambient condition. Examples of suitable coalescents include ethylene glycol monobutyl ether, ethylene glycol monopropyl ether, ethylene glycol monohexyl ether, ethylene glycol 2-ethyl hexyl ether, ethylene glycol phenyl ether, diethylene glycol monomethyl ether, diethylene glycol monoethyl ether, diethylene glycol monopropyl ether, diethylene glycol monobutyl ether, diethylene glycol monohexyl ether, propylene glycol monomethyl ether, propylene glycol monopropyl ether, propylene glycol tertiary butyl ether, propylene glycol monobutyl ether, dipropylene glycol monopropyl ether, dipropylene glycol tertiary butyl ether, dipropylene glycol monobutyl ether, tripropylene glycol methyl ether, aromatic based glycol ether, 2,2,4-trimethyl-1,3-pentanediol monoisobutyrate, benzyl alcohol, n-methyl pyrolidone, diacetone alcohol, dimethyl phthalate, and mixtures thereof. Preferred coalescents are dimethyl phthalate; 2,2,4-trimethyl-1,3-pentanediolmono(2-methylpropanoate); propylene glycol phenyl ether; diisobutyl glutarate; diisobutyl succinate; diisobutyl adipate; and mixtures thereof.

The concentration of the coalescent, $C_c$, based on the solids weight of the aqueous copolymer dispersion, is determined as follows:

$$C_c < (\frac{2}{5} * T_g - C_P * 100 + 4)/100$$

wherein $T_g$ is the glass transition temperature of the emulsion copolymer, °C.; and $C_p$ is the concentration of the copolymerized phosphorous-containing monomer based on the solids weight of the emulsion copolymer. In some embodiments, the concentration of the coalescent is less than $(\frac{2}{5} * T_g - C_P * 100 + 2)/100$.

The aqueous coating composition of the present invention may also comprise pigments and/or extenders. "Pigments" herein refer to materials that can provide whiteness and color including inorganic pigments and organic pigments. Inorganic pigments typically include metal oxides. Examples of suitable metal oxides include titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. Suitable commercially available $TiO_2$ include, for example, KRONOS™ 2310 available from Kronos Worldwide, Inc., Ti-Pure™ R-706 available from DuPont (Wilmington, Del.), TiONA™ AT1 available from Millenium Inorganic Chemicals, or mixtures thereof. $TiO_2$ may be also available in concentrated dispersion form. Organic pigments typically refer to opaque polymers such as ROPAQUE™ Ultra E available from The Dow Chemical Company (ROPAQUE is a trademark of The Dow Chemical Company). When the pigment comprises $TiO_2$, the concentration of $TiO_2$ may be in an amount of 10% by weight or less, 5% by weight or less, or even 3% by weight or less, based on the total weight of the coating composition.

"Extenders" herein refer to white transparent or semi-transparent components, whose purpose is to reduce the cost of the paint by increasing the area covered by a given weight of pigment. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, or mixtures thereof.

The aqueous coating composition of the present invention may have a pigment volume concentration (PVC) of 70% or higher, 80% or higher, or even 95% or higher. The PVC herein is calculated according to the test method described in the Examples section below.

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO™ Airex 902 W and TEGO Foamex 1488 polyether siloxane copolymer emulsions both available from TEGO, BYK-024 silicone deformer available from BYK, or mixtures thereof. When present, the concentration of the defoamer may be, based on the total weight of the aqueous coating composition, from 0.01 to 1% by weight, from 0.05 to 0.8% by weight, or from 0.1 to 0.5% by weight.

The aqueous coating composition of the present invention may further comprise one or more thickeners. The thickeners may be polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR, for example, ACRYSOL™ RM-8W thickener available from The Dow Chemical Company (ACRYSOL is a trademark of The Dow Chemical Company). When present, the concentration of the thickener may be, based on the total weight of the aqueous coating composition, from 0.05 to 3% by weight, from 0.1 to 2% by weight, or from 0.3 to 1% by weight.

The aqueous coating composition of the present invention may further comprise solvents. Examples of suitable solvents include 2-n-butoxyethanol, dipropylene glycol n-butyl ether, propylene glycol n-butyl ether, dipropylene glycol methyl ether, propylene glycol methyl ether, propylene glycol n-propyl ether, or mixtures thereof. When present, the concentration of the solvent may be, based on the total weight of the aqueous coating composition, 0.1% by weight or more, 1% by weight or more, or even 3% by weight or more, and at the same time, 10% by weight or less, 8% by weight or less, or even 5% by weight or less.

The aqueous coating composition of the present invention may further comprise water. The concentration of water may be, based on the total weight of the aqueous coating composition, from 20 to 90% by weight, from 25 to 60% by weight, or from 30 to 40% by weight.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, SURFYNOL™ 104 nonionic wetting agent based on an actacetylenic diol available from Air Products, BYK™-346 and BYK-349 polyether-modified siloxanes both available from BYK, or mixtures thereof.

When present, the concentration of the wetting agent may be, based on the total weight of the aqueous coating composition, 0.1% by weight or more, 0.5% by weight or more, or even 1% by weight or more, and at the same time, 2.5% by weight or less, 2% by weight or less, or even 1% by weight or less.

In addition to the components described above, the aqueous coating composition of the present invention may further comprise any one or combination of the following additives: buffers, non-thickening rheology modifiers, humectants, mildewcides, biocides, anti-skinning agents, colorants, flowing agents, crosslinkers, anti-oxidants, plasticizers, leveling agents, dispersants, thixotropic agents, adhesion promoters, diluents and grind vehicles. When present, these additives may be in a combined amount of from 0.001 to 10% by weight, or from 0.01 to 2% by weight, based on the total weight of the aqueous coating composition.

The aqueous coating composition of the present invention may be prepared with techniques known in the coating art. The aqueous coating composition can be prepared by admixing the aqueous polymer dispersion, the coalescent, and the pigments and/or extenders described above. Other optional components may also be added as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention has desired heat-age stability. For example, the medium shear viscosity change of the aqueous coating composition after heat aging at 50° C. for 10 days is 15 Krebs units (KU) or less, according to the test method described in the Examples section below. The aqueous coating composition upon drying forms a coating film. In some embodiments, the washability of such coating film is 50% greater than that of the coating film made from a coating composition without phosphorous-containing copolymerized units as used in prior art (hereinafter "Comparative Coating Composition"). In a preferred embodiment, the washability of the coating film made from the coating composition of the present invention is 70% greater than, or even 100% greater than that of the coating film made from the Comparative Coating Composition. Washability herein is measured according to the test method described in the Examples section below.

The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. Drying the applied coating composition is generally conducted at room temperature (22 to 25° C.), or even at 35 to 60° C.

The aqueous coating composition of the present invention can be applied to, and adhered to, various substrates. Examples of suitable substrates include wood, metals, plastics, foams, stones, elastomeric substrates, glass, fabrics, concrete, or cementious substrates. The aqueous coating composition is suitable for various coating applications, such as marine and protective coatings, automotive coatings, wood coatings, coil coatings, plastic coatings, powder coatings, can coatings, and civil engineering coatings. The aqueous coating composition is particularly suitable for architectural interior coatings. The aqueous coating composition can be used alone, or in combination with other coatings to form multi-layer coatings. For example, a multi-layer coating may comprise the aqueous coating composition of the present invention as a primer, a tie coat and, optionally, a topcoat.

EXAMPLES

Some embodiments of the invention will now be described in the following Examples, wherein all parts and percentages are by weight unless otherwise specified.

DISPONIL™ FES 32 anionic surfactant is available from Cognis.

Phospho ethyl methylacrylate ("PEM") is available from The Dow Chemical Company.

Butyl acrylate ("BA"), styrene ("ST"), and acrylic Acid ("AA") are all available from Shanghai LangYuan Chemical Co., Ltd.

SILQUEST™ A-171 silane ("A-171") is vinyltrimethoxysilane and is available from Momentive Company.

Sodium persulphate ("SPS"), sodium hydroxide ("NaOH"), and sodium styrene sulfonate ("SSS") are all available from Shanghai Chemical Reagent Co. Ltd.

Propylene glycol and ethylene glycol are used as co-solvents and are available from Shanghai Chemical Reagent Co. Ltd.

Hydroxy ethyl cellulose ("HEC") is used as a thickener and is available from Shanghai Chemical Reagent Co. Ltd.

AMP-95™, available from The Dow Chemical Company, is 2-methyl-2-amino propanol and used as a neutralizer (AMP-95 is a trademark of The Dow Chemical Company).

OROTAN™ 1288, available from The Dow Chemical Company, is a polyacid and is used as a dispersant (OROTAN is a trademark of The Dow Chemical Company).

DISPELAIR™ CF-246 defoamer is available from Blackburn Chemicals.

DB-80, available from Jinyang Gaoling Ltd. Co. (China), is calcined kaolin and used as an extender.

ASP-170, available from Engelhard, is washed kaolin and used as an extender.

TI-PURE™ R-902 titanium dioxide is used as pigment and is available from DuPont.

Talc-800, available from Meijia Chemical Company, is talcum powder and used as an extender.

CC-700, available from Guangfu Building Materials Group (China), is calcium carbonate and used as an extender.

TEXANOL™ ester alcohol, available from Eastman, is 2,2,4-trimethyl-1,3-pentanediolmono(2-methylpropanoate) and is used as a coalescent.

The following standard analytical equipment and methods are used in the Examples.

Pigment Volume Concentration ("PVC") Calculation
PVC of a paint is calculated as follows, $$PVC(\%) = \frac{\text{volume of pigment(s)} + \text{volume extender(s)}}{\text{total dry volume of paint}}.$$

Volume Solids Content

The volume solids content of a coating composition is calculated as follows. The total volume of pigments and extenders in the coating composition is denoted as $V_p$. The total volume of non-volatile solids except pigments and extenders in the coating composition (also known as "volume of solid binder") is denoted as $V_b$. The total volume of the coating composition (also known as "total wet paint volume") is denoted as $V_w$. The volume solids content of the coating composition is measured according to the following equation:

Volume solids=$[(V_p+V_b)/V_w] \times 100\%$

Heat-Age Stability

A Stormer Viscosity Meter is used to test the viscosity of a coating composition according to the ASTM D562 method. After the coating composition is formed, an initial medium shear viscosity, Initial KU, of the coating composition is tested at room temperature, then the coating composition is balanced at room temperature overnight. Then, the viscosity of the coating composition is measured and recoded as Overnight KU. The coating composition is then placed in an oven at 50° C. for 10 days. The viscosity of the coating composition after storage is tested and recorded as Final KU. The difference between Overnight KU and Final KU is defined as the viscosity change, ΔKU. The smaller the ΔKU value, the better the heat-age stability will be. ΔKU needs to be 15 KU or less to be acceptable.

Scrub Test

Washability of paints is determined using a modified version of the ASTM D 2486-74A method. Compared to the ASTM D 2486-74A method, there are four modifications in the test method used herein:

(1) The scrub medium used is a 0.5% by weight household detergent solution for paints with PVC greater than 55%, or an abrasive scrub medium for paints with PVC less than 55%;

(2) The coating films are laid down on vinyl charts vertical to the longer side of the vinyl charts;

(3) There are no shims on the aluminum metal plates of scrub machines; and (4) Material used for making hairs of test brushes: the brushes used herein are made of pig hairs rather than nylon fibers. On each vinyl chart, four coatings are applied with always making one of them derived from the same paint as control (Comparative Example C below) and three others being samples so that relative ratings between control and samples can be obtained. For a given paint, four coating specimens are made and the final rating is obtained by averaging the results of the four specimens. The coating specimens are dried for 7 days in a constant temperature room with a temperature of 25° C. and a humidity of 50% prior to the scrub test.

Preparation of Binder Dispersion A

A monomer emulsion was prepared by combining 706.37 grams (g) of BA, 910.15 g of ST, 16.86 g of AA, 38.40 g of PEM, 5.16 g of A-171, 399.49 g of DI Water, and 70.55 g of a 31.0% by weight aqueous solution of DISPONIL FES 32, and emulsified with stirring. Then, 10.23 g of a 31% by weight aqueous solution of DISPONIL FES 32 and 750 g of DI water were charged to a five liter multi-neck flask fitted with mechanical stirring. The materials in the flask were heated to 90° C. under a nitrogen atmosphere. To the stirred flask, 54.8 g of the monomer emulsion obtained above were added followed by 5.46 g of SPS in 15.6 g of DI water. The remaining monomer emulsion and a solution of 3.41 g of APS in 207.34 g of DI water were then added to the flask over 120 minutes while the reactor temperature was maintained at 88° C. When half of the remaining monomer emulsion was added into the flask, a solution of 6.22 g of NaOH and 97.4 g of DI water were added into the flask over 60 minutes. Then, 32 g of DI water was used to rinse the emulsion feed line to the reactor. The reaction mixture was then cooled down to room temperature. During cooling the reaction mixture, 0.02 g of ferrous sulfate and 0.02 g of EDTA, 4.78 g of t-butyl hydroperoxide (70%) and 2.31 g of isoascorbic acid in aqueous solutions were added into the flask. The obtained dispersion was neutralized to a pH of 7.5 to 8.5 with sodium hydroxide. Properties of the resultant dispersion were reported in Table 1.

Preparation of Binder Dispersions B-F

Acrylic binder dispersions B-F were prepared according to the same procedure as described above for preparing the Binder Dispersion A, wherein the monomer compositions were prepared based on formulations described in Table 2. Properties of the resultant dispersions were reported in Table 1.

TABLE 1

| | | Properties of binder dispersion | | | |
|---|---|---|---|---|---|
| Binder Dispersion | Polymer Composition | Solids (% by weight) | Particle size (nm) | pH value | $T_g$* (° C.) |
| A | 54.3ST/42.1BA/2.3PEM/ 1AA/0.3A-171 | 45.00 | 96 | 8.13 | 30 |
| B | 55.6ST/42.1BA/1PEM/ 1AA/0.3A-171 | 48 | 125 | 8.12 | 30 |
| C | 50.7ST/45.7BA/1AA/ 2.3PEM/0.3A-171 | 45.04 | 89 | 8.00 | 25 |
| D | 49.5ST/45.7BA/1AA/ 3.5PEM/0.3A-171 | 45.09 | 100 | 7.96 | 25 |
| E | 62.4ST/34BA/1AA/ 2.3PEM/0.3A-171 | 44.99 | 95 | 8.02 | 40 |
| F | 59.82ST/37.25BA/2.5 AA/0.33SSS/0.1A-171 | 48.00 | 150 | 8.00 | 35 |

*$T_g$ is calculated by the linear equation described above.

TABLE 2

| | Monomer Composition, % by weight based on the weight of total monomers* | | | | | |
|---|---|---|---|---|---|---|
| | Binder A | Binder B | Binder C | Binder D | Binder E | Binder F |
| PEM | 2.30 | 1.00 | 2.30 | 3.50 | 2.30 | 0 |
| AA | 1.00 | 1.00 | 1.00 | 1.00 | 1.00 | 2.50 |
| SSS | 0 | 0 | 0 | 0 | 0 | 0.33 |
| A-171 | 0.30 | 0.30 | 0.30 | 0.30 | 0.30 | 0.10 |
| BA | 42.10 | 42.10 | 45.70 | 45.70 | 34.00 | 37.25 |
| ST | 54.30 | 55.60 | 50.70 | 49.50 | 62.40 | 59.82 |

*Total monomers are PEM, AA, A-171, BA, ST, and SSS if present.

Example (Ex) 1

The coating composition of Ex 1 was prepared based on formulations described in Table 3. Ingredients of the grind were mixed using a high speed Cowles disperser. Binder A (95 g) was added into the grind. Then, 6.41 g of TEXANOL (15% by weight relative to the binder's solids) were added into the resultant mixture. DISPELAIR CF-246 (2 g) and deionized water (184.69 g) were further added to the mixture and mixed for 30 minutes using a conventional lab mixer. The resultant aqueous coating composition of Ex 1 had 82% PVC and 32.4% volume solids ("VS").

Exs 2-5 and Comparative (Comp) Exs A-C

Coating compositions of Exs 2-5 and Comp Exs A-C were prepared according to the same procedure for Ex 1, except that the binder type and/or the coalescent concentration were different as described in Table 4. When preparing the coating compositions with different coalescent concentration, water dosage was modified accordingly to make the total weight of the coating composition equal to 1000 g, respectively. The coating composition of Comp Ex A was substantially the same as disclosed in U.S. Pat. No. 8,185,714B2. The resultant aqueous coating compositions of Exs 2-5 and Comp Exs A-C all had 82% PVC and 32.4% VS.

TABLE 3

Coating compositions

| Function | Grind | gram |
|---|---|---|
| | Water | 204.50 |
| Solvent | Propylene glycol | 2.50 |
| Solvent | Ethylene glycol | 2.50 |
| Thickener | HEC | 4.00 |
| Neutralizer | AMP-95 | 1.00 |
| Dispersant | OROTAN 1288 | 3.80 |
| Defoamer | DISPELAIR CF-246 | 1.00 |
| Extender | DB-80 | 71.00 |
| Extender | ASP-170 | 25.00 |
| Pigment | TI-PURE R-902 | 29.60 |
| Extender | Talc-800 | 86.00 |
| Extender | CC-700 | 281.00 |
| | Grind Sub-total | 711.90 |
| | LetDown | |
| | Binder A | 95.00 |
| Coalescent | TEXANOL | 6.41 |
| Defoamer | DISPELAIR CF-246 | 2.00 |
| | Water | 184.69 |
| Total | | 1000.00 |

As shown in Table 4, the coating compositions of Comp Exs A and B provided coating films with better washability compared to the coating composition of Comp Ex C. However, the coating composition of Comp Ex A gelled after the heat aging, and the coating composition of Comp Ex B showed ΔKU much higher than 15. It indicates that the coating compositions of Comp Exs A-B did not have acceptable storage stability.

In contrast, the coating compositions of Exs 1-5 provided coating films with better washability compared to that of the coating composition of Comp Ex C, at the same time, showed acceptable heat-age stability.

What is claimed is:
1. An aqueous coating composition comprising:
(a) an aqueous copolymer dispersion comprising an emulsion copolymer having a glass transition temperature of from 8 to 40° C. and comprising, as copolymerized units, based on the solids weight of the emulsion copolymer, from 1 to 3.5% by weight of a phosphorus-containing monomer selected from a phosphoalkyl (meth)acrylate, a phosphoalkoxy (meth)acrylate, salts thereof, and mixtures thereof;
wherein the aqueous copolymer dispersion is present in an amount of from 2.5 to 7.5% by solids weight based on the total weight of the aqueous coating composition;
(b) a coalescent having a concentration, Cc, based on the solids weight of the aqueous copolymer dispersion, being determined as follows:

$$C_c < (2/5 * T_g - C_P * 100 + 4)/100$$

wherein Tg is the glass transition temperature of the emulsion copolymer, ° C.; and $C_P$ is the concentration of the copolymerized phosphorous-containing monomer based on the solids weight of the emulsion copolymer;
(c) pigments and/or extenders, wherein the composition has a pigment volume concentration of at least 70%, and
wherein the aqueous coating composition comprises about 0.2 weight % to 0.65 weight % of the coalescent based on the total weight of the coating composition.
2. The aqueous coating composition of claim 1, wherein the emulsion copolymer has a glass transition temperature of from 15 to 30° C.
3. The aqueous coating composition of claim 1, wherein the emulsion copolymer comprises, as copolymerized units,

TABLE 4

| | Ex 1 | Ex 2 | Ex 3 | Ex 4 | Ex 5 | Com Ex A | Com Ex B | Ex 6 | Com Ex C |
|---|---|---|---|---|---|---|---|---|---|
| Binder Dispersion | A | A | B | C | E | A | A | D | F |
| $T_g$ of binder (° C.) | 30 | 30 | 30 | 25 | 40 | 30 | 30 | 25 | 36 |
| PEM (% by weight) | 2.3 | 2.3 | 1.0 | 2.3 | 2.3 | 2.3 | 2.3 | 3.5 | 0 |
| Coalescent (% by weight, relative to binder's solids) | 10 | 5 | 15 | 10 | 15 | 23.4 | 15 | 10 | 10 |
| Coalescent (% by weight, relative to total paint) | 0.427 | 0.214 | 0.641 | 0.427 | 0.641 | 1.00 | 0.641 | 0.427 | 0.427 |
| Initial KU | 92.7 | 80.6 | 83 | 95 | 89.5 | 88.2 | 81.8 | 90.8 | 90.6 |
| Overnight KU | 94 | 87.4 | 88 | 97.7 | 91 | 97.2 | 90.6 | 96.5 | 92.4 |
| Final KU (KU after heat aging at 50° C. for 10 days) | 95.1 | 88.2 | 103 | 93.6 | 101 | Gel | 133 | 111.5 | 95.0 |
| ΔKU | 1.1 | 0.8 | 15 | -4.1 | 10 | n.a. | 42.4 | 15.0 | 4.4 |
| Properties of the resultant coating films | | | | | | | | | |
| Washability | 230% | 210% | 150% | 210% | 210% | 850% | 700% | 250% | 100% | from 1.5 to 3% by weight of the phosphorus-containing monomer, based on the solids weight of the emulsion copolymer.

4. The aqueous composition of claim 1, wherein the phosphorous-containing monomer is selected from phosphoethyl (meth)acrylate, phosphopropyl (meth)acrylate, phosphobutyl (meth)acrylate, salts thereof and mixtures thereof.

5. The aqueous composition of claim 1, wherein the coalescent is selected from 2,2,4-trimethyl-1,3-pentanediol-mono(2-methylpropanoate); propylene glycol phenyl ether; diisobutyl glutarate; diisobutyl succinate; diisobutyl adipate; dimethyl phthalate; or mixtures thereof.

6. The aqueous coating composition of claim 1, wherein the emulsion copolymer also comprises, as copolymerized units, a monomer selected from $C_2$-$C_{12}$ alkyl esters of an acrylic acid and an ethylenically unsaturated monomer having a benzene ring.

7. The aqueous coating composition of claim 1, wherein the pigment comprises titanium dioxide.

8. The aqueous coating composition of claim 7, wherein titanium dioxide is present in an amount of 10% by weight or less, based on the total weight of the coating composition.

9. The aqueous coating composition of claim 1, further comprising water, a solvent, a wetting agent, a defoamer, a thickener, or mixtures thereof.

10. The aqueous coating composition of claim 1, wherein the coalescent is 2,2,4-trimethyl-1,3-pentanediolmono(2-methylpropanoate).

\* \* \* \* \*